No. 608,041. Patented July 26, 1898.
W. G. HARRIS.
ADJUSTING DEVICE FOR BALL BEARINGS.
(Application filed July 29, 1897.)
(No Model.)
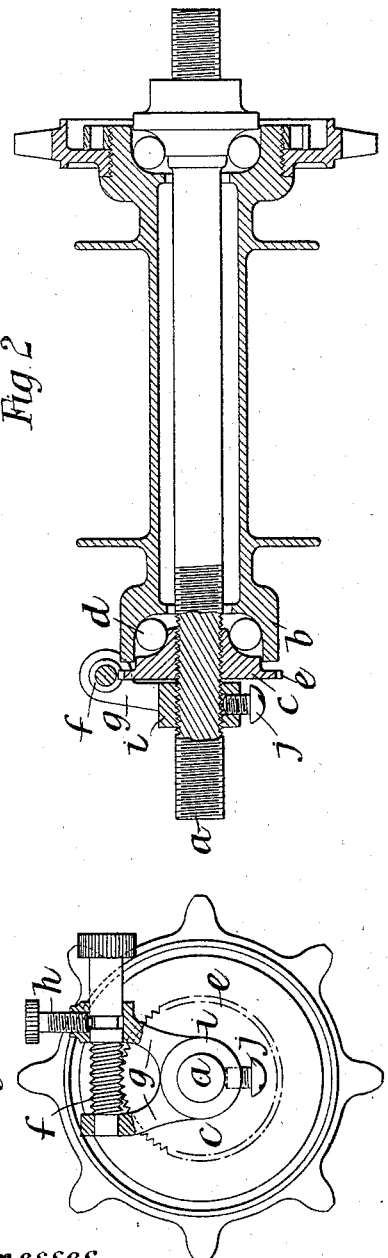
Witnesses.
J. D. Kingsbury
J. C. Shunn
Inventors.
William George Harris
by his attys
Whitaker Prevost

UNITED STATES PATENT OFFICE.

WILLIAM GEORGE HARRIS, OF NEWTON ABBOT, ENGLAND, ASSIGNOR OF ONE-HALF TO FREDERICK PERTWEE, OF LONDON, ENGLAND.

ADJUSTING DEVICE FOR BALL-BEARINGS.

SPECIFICATION forming part of Letters Patent No. 608,041, dated July 26, 1898.

Application filed July 29, 1897. Serial No. 646,366. (No model.)

*To all whom it may concern:*

Be it known that I, WILLIAM GEORGE HARRIS, a subject of the Queen of Great Britain, residing at Newton Abbot, England, have invented a new and useful Improved Adjusting Device for Ball-Bearings, of which the following is a specification.

This invention relates to ball-bearings, and has for its object to provide improved means for adjusting the cones of the bearings in order to adjust or compensate for the wear of the latter without the use of check-nuts or similar contrivances.

According to this invention the adjustable cone is provided with a rim or flange having teeth cut upon its periphery with which a worm engages, the said worm being mounted in a suitable bracket in such a manner that its rotation in one or the other direction serves for rotating the cone.

To enable the invention to be fully understood, the same shall be described by reference to the accompanying drawings, in which—

Figure 1 is an end sectional elevation of the back wheel hub and axle of a bicycle having the invention applied to it. Fig. 2 is a longitudinal section of the said hub and axle.

$a$ is the axle or shaft.

$b$ is the cup or fixed cone of the ball-bearing.

$c$ is the adjustable cone, which is movable longitudinally relatively with the fixed cone, and $d\ d$ are the balls which run between the cup and cone.

$e$ is the rim or flange formed upon the said cone and having teeth cut upon its periphery with which a worm $f$ engages, the said worm being provided with a milled head for operating it and mounted in arms $g\ g$, in one of which is inserted a set-screw $h$, which performs the double function of preventing the longitudinal movement of the worm in its bearings and also of clamping the said worm to hold it against rotation when desired.

In the arrangement of the invention shown in the drawings, which illustrate the application to a fixed axle, the cone $c$ is screwed onto the axle and the arms $g\ g$ are formed upon a boss or bracket $i$, which is also screwed onto the axle and provided with a set-screw $j$ to hold it against rotation upon the said axle. With this arrangement it will be understood that the rotation of the worm $f$ serves to more or less rotate the cone $c$ relatively with the fixed cone, and consequently to more or less adjust the bearing.

The said invention is also applicable to the pedals of bicycles, the arrangement being the same as that shown in Fig. 2—that is to say, the cone is screwed upon the pedal-pin and the boss carrying the arms $g\ g$ for the worm is fixed to the said pedal-pin.

It will be noted that in all the forms of my device shown in the drawings the worm-shaft is provided with a portion between the worm $f$ and the milled head, which is of the same diameter as the worm and fits in the aperture of one of the arms $g$ and is provided with an annular groove which is engaged by the set-screw $h$. The set-screw thus prevents the longitudinal movement of the worm-shaft and by turning it up tight will lock the shaft against rotary movement, and by loosening the said screw $h$ sufficiently the worm-shaft can be withdrawn longitudinally from the bracket.

Having now particularly described and ascertained the nature of my said invention and in what manner the same is to be performed, I declare that what I claim is—

1. An adjusting device for bearings comprising among its members a cone provided with peripheral teeth and an internally-threaded shaft-engaging aperture, a bracket provided with a shaft-engaging aperture, a set-screw and a pair of arms, and a worm supported in said arms in position to engage the teeth of said worm-wheel, substantially as described.

2. An adjusting device for bearings comprising among its members, a cone provided with peripheral teeth and a threaded shaft-engaging aperture, a bracket having a shaft-engaging aperture, a set-screw for securing the bracket to the shaft and a pair of arms provided with apertures therein, a worm-shaft journaled in said arms, and provided with an annular recess and a set-screw in one of said arms engaging said recess to prevent the longitudinal movement of said shaft, substantially as described.

WILLIAM GEORGE HARRIS.

Witnesses:
 A. ALBUTT,
 E. CHURCHER.